United States Patent
Djuric et al.

(10) Patent No.: US 10,452,068 B2
(45) Date of Patent: Oct. 22, 2019

(54) NEURAL NETWORK SYSTEM FOR AUTONOMOUS VEHICLE CONTROL

(71) Applicant: Uber Technologies, Inc., San Francisco, CA (US)

(72) Inventors: Nemanja Djuric, Pittsburgh, PA (US); John Houston, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 258 days.

(21) Appl. No.: 15/295,088

(22) Filed: Oct. 17, 2016

(65) Prior Publication Data
US 2018/0107215 A1    Apr. 19, 2018

(51) Int. Cl.
G05D 1/00    (2006.01)
G05D 1/02    (2006.01)
G06N 3/04    (2006.01)
G06N 3/08    (2006.01)
G01C 21/34   (2006.01)

(52) U.S. Cl.
CPC ....... G05D 1/0088 (2013.01); G01C 21/3407 (2013.01); G05D 1/0221 (2013.01); G06N 3/04 (2013.01); G06N 3/08 (2013.01); G05D 2201/0213 (2013.01)

(58) Field of Classification Search
CPC .............. G05D 1/0088; G05D 1/0221; G05D 2201/0213; G01C 21/26; G06N 3/04; G06N 3/08
USPC .......................................................... 701/27
See application file for complete search history.

(56) References Cited

U.S. PATENT DOCUMENTS

| | | |
|---|---|---|
| 8,521,352 B1 | 8/2013 | Ferguson |
| 8,676,430 B1 | 3/2014 | Ferguson et al. |
| 8,825,265 B1 | 9/2014 | Ferguson et al. |
| 9,140,792 B2 | 9/2015 | Zeng |
| 9,459,625 B1 | 10/2016 | Ferguson |
| 9,494,439 B1 | 11/2016 | Ross |
| 9,631,933 B1 | 4/2017 | Aula |

(Continued)

FOREIGN PATENT DOCUMENTS

| | | |
|---|---|---|
| EP | 3032458 | 6/2016 |
| RU | 132393 | 9/2013 |

(Continued)

OTHER PUBLICATIONS

ISR and Written Opinion in PCT/US2017/056277 dated Apr. 5, 2018.

(Continued)

*Primary Examiner* — Anne M Antonucci
*Assistant Examiner* — James E Stroud
(74) *Attorney, Agent, or Firm* — Dority & Manning, PA

(57) ABSTRACT

A neural network may be utilized for autonomously driving a self-driving vehicle (SDV). The neural network can establish a destination location in local coordinates relative to the SDV. The neural network may then identify one or more navigation points in a forward operational direction of the SDV, and process sensor data from a sensor system of the SDV, the sensor data providing a sensor view of the forward operational direction of the SDV. Utilizing the sensor data, the neural network can operate acceleration, braking, and steering systems of the SDV to continuously follow the one or more navigation points along an established route to the destination location.

14 Claims, 6 Drawing Sheets

(56) References Cited

U.S. PATENT DOCUMENTS

| | | |
|---|---|---|
| 9,739,881 B1 | 8/2017 | Pavek |
| 9,841,763 B1 | 12/2017 | Valois |
| 9,902,403 B2 | 2/2018 | Donnelly |
| 9,904,375 B1 | 2/2018 | Donnelly |
| 2008/0033645 A1 | 2/2008 | Levinson |
| 2010/0262359 A1 | 10/2010 | Motoyama |
| 2012/0296539 A1 | 11/2012 | Cooprider |
| 2012/0310516 A1 | 12/2012 | Zheng |
| 2013/0060461 A1 | 3/2013 | Wong |
| 2013/0117321 A1* | 5/2013 | Fischer ............. G06F 17/30289 707/792 |
| 2014/0046585 A1 | 2/2014 | Morris, IV |
| 2015/0369617 A1 | 12/2015 | Ding |
| 2016/0054135 A1 | 2/2016 | Fowe |
| 2016/0125608 A1 | 5/2016 | Sorstedt |
| 2016/0167582 A1 | 6/2016 | Chen |
| 2016/0349063 A1 | 12/2016 | Maurer |
| 2017/0008521 A1* | 1/2017 | Braunstein ............. G01C 21/32 |
| 2017/0023659 A1 | 1/2017 | Bruemmer |
| 2017/0193826 A1 | 7/2017 | Marueli |
| 2017/0227647 A1 | 8/2017 | Baik |
| 2017/0309172 A1 | 10/2017 | Linder |
| 2017/0315229 A1 | 11/2017 | Pavek |
| 2017/0316696 A1 | 11/2017 | Bartel |
| 2018/0060778 A1 | 3/2018 | Guo |
| 2018/0061242 A1 | 3/2018 | Bavar |
| 2018/0143639 A1 | 5/2018 | Singhal |

FOREIGN PATENT DOCUMENTS

| | | |
|---|---|---|
| WO | WO 2011055978 | 5/2011 |
| WO | WO 2014/147361 | 9/2014 |

OTHER PUBLICATIONS

ISR and WO in PCT/US2017/046796 dated Feb. 28, 2018.
ISR in PCT/US2017/040532 dated Jan. 11, 2018.
International Preliminary Report on Patentability for PCT/US2017/056277, dated May 2, 2019, 6 pages.

* cited by examiner

NEURAL NETWORK SYSTEM FOR AUTONOMOUS VEHICLE CONTROL

BACKGROUND

Neural networks are being applied in various industries to improve decision-making and provide solutions to a wide assortment of computational tasks that have been proven problematic or excessively resource intensive with traditional rule-based programming. For example, speech recognition, audio recognition, task-oriented activities (e.g., gaming activities such as chess and checkers), problem solving, and question answering have seen breakthrough advancements through the use of neural networks and deep learning. These networks can employ multi-layered, non-linear processing and adaptation techniques that can offer significant efficiencies in certain computing functions, especially when certain cognitive human tasks are being substituted or improved upon.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
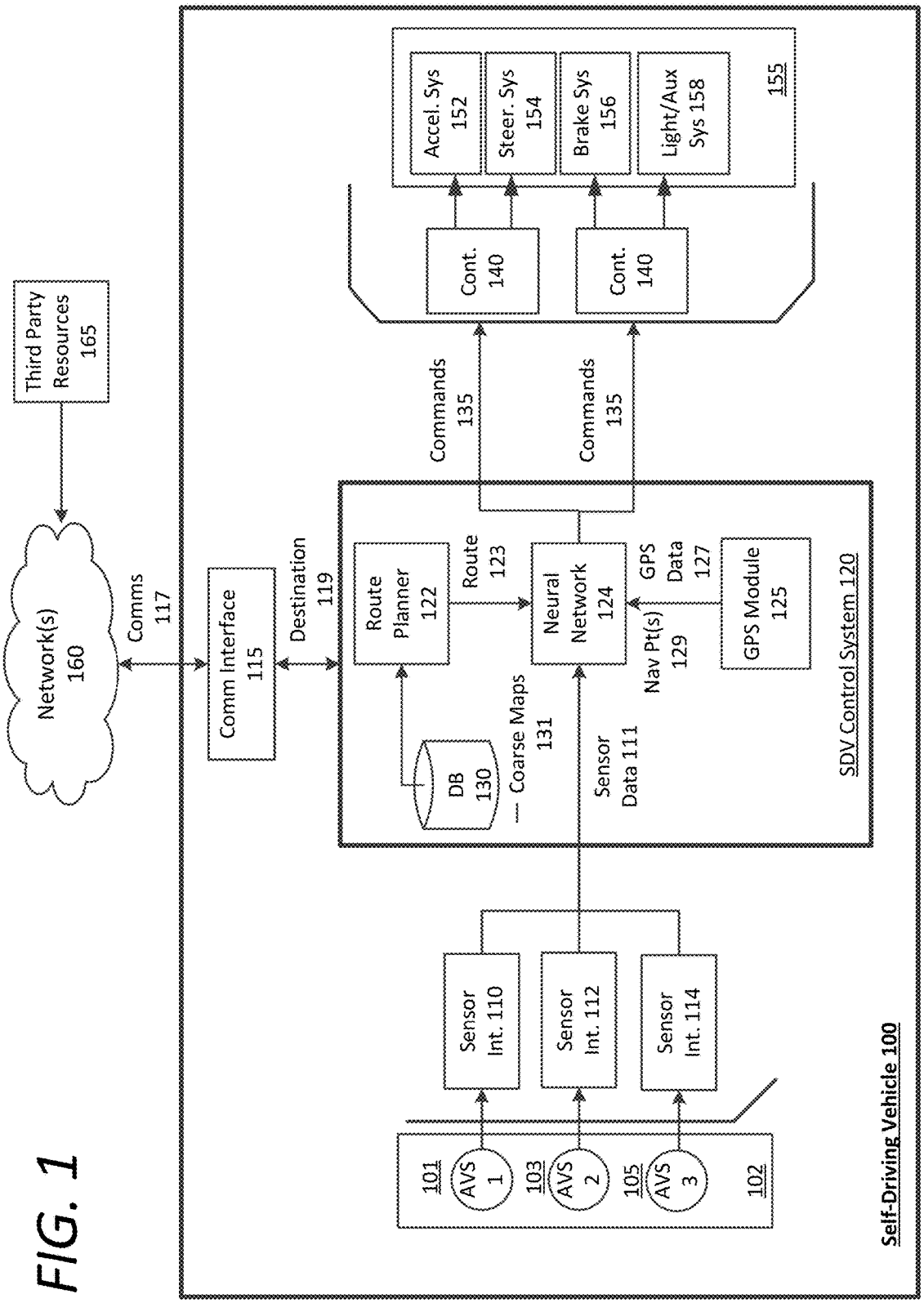
FIG. 1 is a block diagram illustrating an example self-driving vehicle implementing a neural network control system, as described herein.

Certain autonomous driving technologies involve the use of very detailed and preprocessed localization maps that an autonomous vehicle's control system can continuously compare to a live sensor view in order to operate the vehicle through road traffic and detect any potential hazards. As an example, navigation techniques for self-driving vehicles can involve setting an endpoint location, determining a route from a current location to the endpoint, and performing dynamic localization and object detection to safely operate the vehicle to the endpoint. While providing adequate safety, such methods can be excessively labor-intensive, requiring pre-recorded street view maps on the roads in a given region, and processing those maps to establish localization parameters, such as lane positions, static objects (e.g., trees, buildings, curbs, parking meters, fire hydrants, etc.), objects of interest (e.g., traffic signals and signs), dynamic objects (e.g., people, other vehicles, etc.), and the like. Furthermore, in order to operate safely in variable conditions, a suite of sensors is typically required composed of combinations of LIDAR, radar, stereoscopic and monocular cameras, IR sensors, and even sonar. However, drawbacks to such autonomous driving methods have become increasingly evident. For example, in order to implement these methods in new driving areas, new localization maps must be recorded, processed, and uploaded to the SDVs.

To address the shortcomings of the current methodologies, disclosed herein are examples of a neural network system for autonomous control of a self-driving vehicle (SDV). According to examples provided herein, the neural network system can implement a machine learning model (e.g., supervised learning) to learn and improve autonomous driving in public road environments. Certain neural network (or deep learning) methodologies can involve lane-keeping, or maintaining the SDV within a certain lane while a data processing system implements traditional instruction-based control of the SDV's control mechanisms (e.g., acceleration, braking, and steering systems). According to examples provided herein, the neural network system can establish or otherwise be inputted with a destination location in local coordinates relative to the SDV (e.g., in an inertial reference frame), and can establish or otherwise be inputted with one or more navigation points in a forward operational direction of the SDV along a route to the destination (e.g., in global coordinates and affixed to the non-inertial reference frame of the SDV). For example, each of the one or more navigation points can comprise two-dimensional coordinates having values that vary in relation to the destination location (e.g., Cartesian x-y coordinate values, or distance and angle values in polar coordinates). In variations, the navigation points can be established in three-dimensional space (e.g., Cartesian or spherical coordinate systems). Accordingly, the neural network utilizes the coordinate values of the navigation point(s)—established persistently ahead of the SDV along the route—to make decisions with regards to acceleration, braking, steering, lane selection, and signaling.

In certain aspects, the neural network system can operate as a control system of the SDV, on processing resources external to the SDV (communicating decisions or control commands to the SDV over one or more networks), or can operate as a combination of both. In various implementations, the SDV can include a sensor array comprising any number of sensors and sensor types, such as LIDAR, stereoscopic and/or monocular cameras, radar, sonar, certain types of proximity sensors (e.g., infrared sensors), and the like. In navigating the SDV to a destination, the neural network can operate the SDV's acceleration, braking, and steering systems along the route, relying on both the navigation point(s) and sensor data from the SDV's sensor array in order to not only maintain the SDV within a respective lane, but to also react or make decisions with respect to lane selections, traffic signals, pedestrians, other vehicles, bicyclists, obstacles, road signs, and the like. Along these lines, the neural network system can undergo supervised learning through a training phase, a test phase, and eventually an implementation phase in which the neural network operates the SDV safely on public roads and highways to transport passengers to sequential destinations (e.g., once the neural network meets a standardized safety threshold).

In some examples, the neural network system can utilize a global position system (GPS) module to set the navigation points in global coordinates and the destination location in local coordinates. According to examples, the neural network system can utilize the GPS module to set positioning signals (i.e., the navigation points) at predetermined distances ahead of the SDV (or temporally ahead of the vehicle based on traffic and speed). In variations, the navigation points can be set by a backend management system at persistent distances ahead of the SDV along the route. An example backend route management system can comprise a network-based transport system that manages on-demand transportation arrangement services, such as those provided by Uber Technologies, Inc., of San Francisco, Calif.

Examples described herein recognize that a precise navigation point signal can result in an overfitting problem by the neural network system, in which the neural network system becomes too dependent on the navigation points, and thus begins to blindly follow them as opposed to relying on the sensor data for decision-making. In order to address the risk of overfitting, the neural network system can introduce noise to the positioning signals corresponding to the navigation points to cause the neural network to rely more on image data or sensor data, reducing the potential for overreliance on the navigation points. The noise can reduce the accuracy of the positioning signal (e.g., boosting horizontal error), causing the neural network system to process the sensor data, stabilizing the SDV's road performance, and making the neural network more robust.

A key aspect to the neural network system is the utilization of the navigation points as "carrots" that enable the neural network system to perform additional autonomous driving tasks on top of simple lane-keeping, although lane-keeping may be significantly improved through implementation of examples described herein. In various aspects, the neural network system can track the navigation points—which themselves follow the route to the destination—to select lanes, make turns on new roads, and respond to events, traffic signals, road signs, weather conditions, and other contingencies. Furthermore, in order to increase robustness, the distance or time of the navigation point(s) ahead of the vehicle, the number of navigation points, and the amount of noise introduced to the navigation point signals can be adjusted. Thus, in one example, the neural network system establishes a pair of navigation points in series along the route ahead of the SDV (e.g., a first point at 50 meters and a second point at 100 meters). In operating the SDV along the route, the neural network system can continuously compare the coordinate values of each navigation signal to make decisions with regard to acceleration, steering, and braking. In further examples, the neural network system can further dynamically compare the coordinate values of the navigation points to the coordinate of the SDV itself in order to determine an immediate route plan.

For example, each of the vehicle's coordinates and the coordinates of the navigation points can be established in global coordinates, such that the coordinate values of each may be readily compared. The neural network system can take the destination in local coordinates as an additional input. The nature of the compared coordinate values (e.g., whether the individual x-values and y-values of each coordinate are converging or diverging) can indicate to the neural network system whether a turn is upcoming or the nature of the overall route to the destination. Accordingly, in tracking or following the navigation points, the neural network can create a series of successive high level route plans (e.g., for the next fifty or one hundred meters of the overall route). The neural network system may conjunctively utilize the sensor data to safely autonomously operate the SDV along each successive route plan.

Among other benefits, the examples described herein achieve a technical effect of improving upon current autonomous driving methodologies by utilizing neural networks to overcome the challenges apparent in rule-based programming for autonomous driving, such as the need to record detailed surface maps in all areas of operation. Using neural network technology enables the use of readily available maps (e.g., coarse road network maps) as route references, while the neural network system utilizes the navigation points and sensor data to autonomously operate the vehicle to the destination. Thus, given a destination, the neural network system can establish a route and track persistent navigation points to operate the vehicle to the destination.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs and SDVs. For example, some vehicles may enable automation in limited scenarios, such as on highways, provided that drivers are present in the vehicle. More advanced AVs and SDVs can drive without any human assistance from within or external to the vehicle.

Furthermore, numerous examples described herein reference a "neural network," "deep learning," or "deep neural network." Such terms may be used throughout the disclosure interchangeably to represent the execution of one or more machine learning models (e.g., a set of algorithms) that utilize multiple processing layers (e.g., comprising any number of linear and/or non-linear mappings or transformations) to infer, adapt, confirm, and/or make decisions based on any number of inputs. In the context of the present disclosure, a "neural network" or "deep neural network" is provided that implements one or more machine learning models that causes the network to operate the control mechanisms of a vehicle autonomously (e.g., the acceleration, braking, steering, and/or auxiliary systems of the vehicle). Such examples can receive multiple inputs corresponding to navigation points having global coordinate values, the vehicle's own global coordinates, a succession of destination locations (e.g., in local coordinates), and sensor data that provides a sensor view of the surroundings of the vehicle (e.g., in a forward operational direction). Furthermore, such examples can be trained, tested, and implemented to perform human cognitive functions with respect to maintaining the vehicle within a lane, and making practical, cautious, and safe decisions with respect to changing lanes, avoiding hazards or hazard threats, following traffic rules and regulations, and safely making turns to autonomously drive the vehicle on test roads and public roads and highways.

System Description

FIG. 1 is a block diagram illustrating an example self-driving vehicle implementing a neural network control system, as described herein. In an example of FIG. 1, a control system 120 can autonomously operate the SDV 100 in a given geographic region for a variety of purposes, including transport services (e.g., transport of humans, delivery services, etc.). In examples described, the SDV 100 can operate without human control. For example, the SDV 100 can autonomously steer, accelerate, shift, brake, and operate lighting components. Some variations also recognize that the SDV 100 can switch between an autonomous mode, in which the SDV control system 120 autonomously operates the SDV 100, and a manual mode in which a driver takes over manual control of the acceleration system 152, steering system 154, and braking system 156.

According to some examples, the control system 120 can utilize specific sensor resources in order to intelligently operate the SDV 100 in a variety of driving environments and conditions. For example, the control system 120 can operate the vehicle 100 by autonomously operating the steering, acceleration, and braking systems 152, 154, 156 of the SDV 100 to a specified destination. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes a computer or processing system which operates to process sensor data 111 received from a sensor system 102 of the SDV 100 that provides a sensor view of a road segment upon which the SDV 100 operates. The sensor data 111 can be used to determine actions which are to be performed by the SDV 100 in order for the SDV 100 to continue on a route to a destination. In some variations, the control system 120 can include other functionality, such as wireless communication capabilities using a communication interface 115, to send and/or receive wireless communications 117 over one or more networks 160 with one or more remote sources. In controlling the SDV 100, the control system 120 can issue commands 135 to control various electromechanical interfaces of the SDV 100. The commands 135 can serve to control the various control mechanisms 155 of the SDV 100, including the vehicle's acceleration system 152, steering system 154, braking system 156, and auxiliary systems 158 (e.g., lights and directional signals).

The SDV 100 can be equipped with multiple types of sensors 101, 103, 105 which can combine to provide a computerized perception of the space and the physical environment surrounding the SDV 100. Likewise, the control system 120 can operate within the SDV 100 to receive sensor data 111 from the collection of sensors 101, 103, 105 and to control the various control mechanisms 155 in order to autonomously operate the SDV 100. For example, the control system 120 can analyze the sensor data 111 to generate low level commands 135 executable by one or more controllers 140 that directly control the acceleration system 152, steering system 154, and braking system 156 of the SDV 100. Execution of the commands 135 by the controllers 140 can result in throttle inputs, braking inputs, and steering inputs that collectively cause the SDV 100 to operate along sequential road segments to a particular destination.

In more detail, the sensors 101, 103, 105 operate to collectively obtain a sensor view for the vehicle 100 (e.g., in a forward operational direction, or providing a 360 degree sensor view), and further to obtain situational information proximate to the SDV 100, including any potential hazards or obstacles. By way of example, the sensors 101, 103, 105 can include multiple sets of camera systems (video cameras, stereoscopic cameras or depth perception cameras, long range monocular cameras), remote detection sensors such as radar, LIDAR, and sonar, proximity sensors, infrared sensors, touch sensors, and the like. According to examples provided herein, the sensors can be arranged or grouped in a sensor system or array 102 (e.g., in a sensor pod mounted to the roof of the SDV 100) comprising any number of LIDAR, radar, monocular camera, stereoscopic camera, sonar, infrared, or other active or passive sensor systems.

Each of the sensors 101, 103, 105 can communicate with the control system 120 utilizing a corresponding sensor interface 110, 112, 114. Each of the sensor interfaces 110, 112, 114 can include, for example, hardware and/or other logical components which are coupled or otherwise provided with the respective sensor. For example, the sensors 101, 103, 105 can include a video camera and/or stereoscopic camera set which continually generates image data of the physical environment of the SDV 100. As an addition or alternative, the sensor interfaces 110, 112, 114 can include dedicated processing resources, such as provided with field programmable gate arrays (FPGAs) which can, for example, receive and/or preprocess raw image data from the camera sensor.

According to examples provided herein, the SDV control system 120 can implement a neural network 124 executing a machine learning model (e.g., a set of machine learning algorithms) to autonomously operate the control mechanisms 155 of the SDV 100. In some aspects, the control system 120 can receive a destination 119 either from an external entity over the network 160 (e.g., a backend route management system), or via input from a passenger of the SDV 100. The control system 120 can include a route planner 122 and a database 130 storing coarse road network maps 131, which the route planner 122 can utilize to determine a route 123 from a current location of the SDV 100 to the destination 119. In some aspects, the route planner 122 can also access third party network resources 165 over the one or more networks 160 to receive map data and/or traffic data to determine a most optimal route 123 to the destination 119.

In further implementations, the route planner 122 can update the route 123 dynamically as traffic conditions change while the SDV 100 is en route to the destination 119. As provided herein, the updates to the route 123 can cause the neural network 124 to adapt certain configurations that enable it to follow or track the updated route 123. Specifically, the neural network 124 can receive GPS data 127 from a GPS module 125 of the SDV 100, and establish one or more navigation points 129 on the route 123 affixed a certain distance or temporally ahead of the SDV 100. However, as described herein, examples are not limited to a single navigation point 129, but can comprise a pair, or any number of navigation points 129 set along the route 123 and in a forward operational direction of the SDV 100.

As provided herein, the navigation point(s) 129 can be established in global coordinates, whereas the destination 119 can be established in local coordinates. In other words, the navigation point(s) 129 can be set to be persistently ahead of the SDV 100 (e.g., fifty meters ahead), and can have coordinate values that continuously update in global coordinates as the SDV 100 progresses along the route 123. On the other hand, the neural network 124 can establish the destination 119 in local coordinates with respect to the traveling SDV 100. In accordance with examples, the neural network 124 can be trained to follow the navigation point(s) 129, which can act as a reference for the neural network 124 to make upcoming decisions, such as lane selections, acceleration and braking inputs in anticipation of a turn, and the turning actions themselves. In tracking the navigation point(s) 129, the neural network 124 is provided with a simple framework that enables the neural network 124 perform mid and high level operations on the control mechanisms 155 analogous to human decision-making to anticipate upcoming turns (e.g., lane selection, deceleration, and braking).

In variations, once the global coordinates of the SDV 100 are known from the GPS module 125, a local coordinate system may be established with the SDV's location as the origin point (e.g., in a local Cartesian x-y coordinate system). Thereafter, the navigation points 129 may be generated in this local coordinate system to be persistently ahead of the SDV 100 along the route 123. Thus, the neural network 124 can readily compare the coordinate values of the navigation points 129 in the local coordinate system of the SDV 100 (e.g., to determine an immediate route plan for an upcoming route segment). Additionally or alternatively, the neural network 124 can compare the coordinate values of the navigation points 129 with successive destinations set along the route 123 to identify route features, such as upcoming turns. Based on the comparisons between the coordinate values, the neural network 124 can modulate the acceleration, braking, and steering inputs accordingly.

It is contemplated that the navigation points 129 may be established to be persistently ahead of the SDV 100 along the current route, or may be selectively established ahead of the SDV 100 when the SDV 100 approaches various decision points along the route. For example, the navigation points 129 may be excluded when the route ahead of the SDV 100 provides only limited decision-making (e.g., a straight road with no intersections), which enables the neural network 124 to focus mainly on the sensor data 111 to identify an potential hazards and modulate steering, braking, and acceleration inputs based on observation of the SDV's situational surroundings. Upon approaching a decision point along the route—such as an intersection or road fork where the neural network 124 must decide on two or more directions—the navigation points 129 can be established, as described herein, to enable the neural network 124 to readily determine the immediate plan for the decision point (e.g., a turn action), and execute acceleration, braking, steering, and/or lane changing actions accordingly.

In some aspects, the one or more navigation points 129 may be triggered based on a predetermined distance or time prior to the SDV 100 approaching an intersection. For example, a road network map may be utilized to identify approach zones for decision areas (e.g., intersections), which can trigger the navigation points 129. In other implementations, the navigation points 129 may be triggered based on other parameters, such as a braking input by the neural network 124, a threshold speed being exceeded or crossed below, and the like.

For lower level operations, the neural network 124 can analyze the sensor data 111 to detect other vehicles and any potential obstacles, hazards, or objects of interest (e.g., pedestrians or bicyclists). In variations, the neural network 124 can further analyze the sensor data 111 to detect traffic lanes, bike lanes, road signs, traffic signals, the current speed limit, and road markers (e.g., arrows painted on the road). In processing the sensor data 111, the neural network 124 does not require detailed localization maps or sub-maps of pre-recorded and processed road segments along the route 123. Rather, in training and testing phases, the neural network 124 can implement machine learning to analyze the sensor data 111 to detect and identify objects of interest, ignore other objects, and operate the control mechanisms 155 of the SDV 100 to avoid any potential incidents. A more detailed discussion of the neural network 124 is provided below with respect to FIG. 2.

Figure 2:
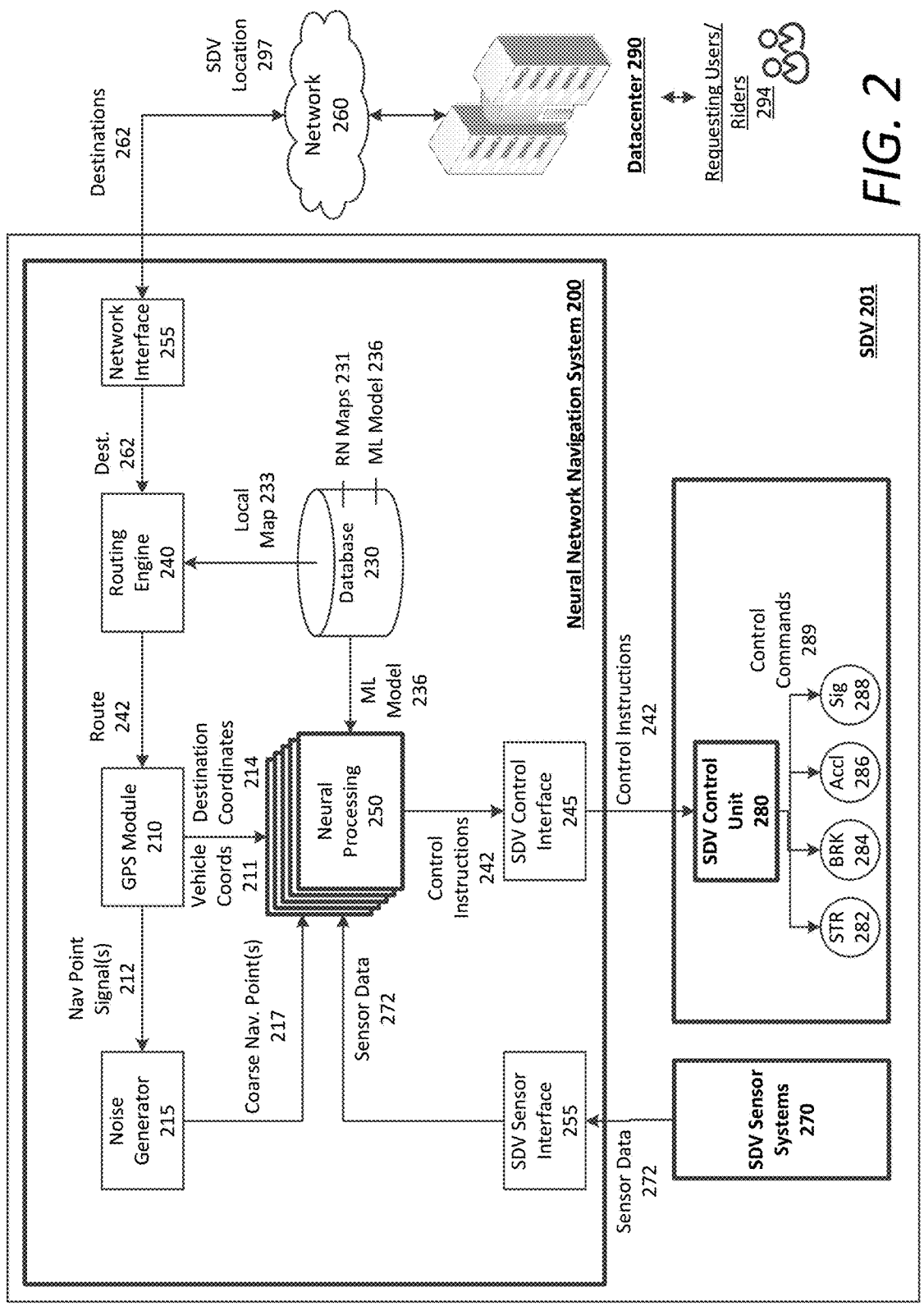
FIG. 2 is a block diagram illustrating an example neural network navigation system utilized in connection with a self-driving vehicle, according to examples described herein.

FIG. 2 is a block diagram illustrating an example neural network navigation system utilized in connection with a self-driving vehicle, according to examples described herein. In many aspects, the neural network navigation system 200 of the SDV 201 shown in FIG. 2 can perform one or more functions of the SDV control system 120 and neural network 124 as shown and described with respect to FIG. 1. As an example, the neural network navigation system 200 can comprise neural processing resources 250 that implement deep learning to train, adapt, and improve autonomous driving capabilities. In certain examples, the neural network navigation system 200 can include a network interface 255 that connects the neural network navigation system 200 to one or more networks 260. In some examples, the network interface 255 can communicate with one or more external devices over the network 260 to receive successive destinations 262.

In some implementations, the neural network navigation system 200 can communicate with a datacenter 290 hosting a backend transportation management system that deploys a fleet of SDVs throughout a given region (e.g., a metropolitan area) to provide application-based, on-demand transportation services, such as those provided by Uber Technologies, Inc. In such implementations, the datacenter 290 can receive driver and SDV locations throughout the given region, receive pick-up requests from requesting users 294, match those users with proximate available drivers or SDVs, and send invitations to those drivers and SDVs to service the pick-up requests. When the SDV 201 is selected to service a particular pick-up request, the datacenter 290 can transmit a destination 262 to the SDV 201, where the destination 262 corresponds to the pick-up location in which the SDV 201 is to rendezvous with the requesting user 294. Once the SDV 201 arrives at the pick-up location, the requesting user 294 or the datacenter 290 can provide the SDV 201 with a new destination 262—corresponding to a desired drop-off location for the user. Additionally or alternatively, the neural network navigation system 200 can receive the destination 262 locally from the passenger via an on-board interface, such as a display screen or a voice input interface (e.g., implementing speech recognition). Accordingly, the overall journey of the SDV 201 over the course of any given time frame can comprise a sequence of destinations 262 wherever a road network exists.

In any case, the destination 262 can be submitted to a routing engine 240 of the neural network navigation system 200. The routing engine 240 can access a database 230 storing road network maps 231, and can determine an optimal route 242 for the SDV 201 to travel from a current location to the destination 262. In certain implementations, the optimal route 242 can comprise a route that minimizes distance or time with regards to traffic conditions, speed limits, traffic signals, intersections, and the like. In some aspects, the neural network navigation system 200 can include a GPS module 210 (or other location-based resource) that can establish one or more navigation point signals 212 for the SDV 201 at predetermined distances in a forward operational direction of the SDV 201 along the route. As described herein, the navigation points corresponding to the navigation point signals 212 can be established to be persistently ahead of the SDV 201 along the route 242, either distance-wise or temporally.

In some examples, the GPS module 210 can provide the neural processing resources 250 with GPS signals corresponding to the navigation points, which the neural processing resources 250 can project ahead of the SDV 200 as navigation points to follow along the route 242 to the destination 262. In such examples, the neural network processing resources 250 can establish the navigation point signals 212 in global coordinates, or coordinates with respect to an inertial frame of reference. Accordingly, as the SDV 201 travels throughout the given region, the coordinate values of the navigation points will vary with respect to the inertial reference frame. As such, the navigation points can be affixed to the SDV's 201 non-inertial reference frame at predetermined distances ahead of the SDV 201 along the route 242 (e.g., analogous to an L4 Lagrange point). In one example, the neural network navigation system 200 can establish the destination coordinates 214 in local coordinates, or as an address point, in the non-inertial reference frame of the SDV 100. Accordingly, the navigation point coordinates can be tracked by the neural processing resources 250 to the destination 262 by comparison of their coordinate values and/or the coordinate values of the vehicle 211.

In variations, the navigation points 212 can be established in a local coordinate system having an origin at the SDV's current location. Furthermore, the neural network processing resources 250 can readily compare the coordinate values of the navigation points 212 with the SDV's current location as the origin. Additionally or alternatively, the navigation points 212 can be computed based on the current location of the SDV 201 and the map route 242 of the SDV 201 from the current location to an overall destination.

In various implementations, the coordinates for the navigation points 212 can comprise two-dimensional coordinates that the neural processing resources 250 can continuously analyze in order to anticipate and execute turns, make lane selections, speed up or slow down, and otherwise vary the acceleration, braking, and steering inputs for the SDV 201. In certain aspects, each navigation point 212 comprises a Cartesian x-coordinate and y-coordinate, which provides a simple framework for the neural processing resources 250 to track and make control decisions in autonomously operating the SDV 201, as described in further detail below.

Examples provided herein recognize that neural networks can be trained to utilize and balance multiple inputs to achieve a desired outcome. In the case of the neural network navigation system 200, the neural processing resources 250 can execute a machine learning model 236 to utilize both the navigation point signals 212 and sensor data 272 from a number of sensor systems 270 of the SDV 201. As described herein, the SDV sensor systems 270 can comprise monocular and/or stereoscopic cameras. Additionally or alternatively, the SDV sensor systems 270 can include one or more LIDAR systems, radar systems, sonar systems, and/or proximity sensors that can generate the sensor data 272 to be analyzed by the neural processing resources 250 of the neural network navigation system 200. The sensor data 272 can be received via a SDV sensor interface 255, and can be submitted in raw form to the neural processing resources 250, or may be preprocessed by addition processing resources of the SDV 201 to eliminate non-essential data in order to reduce overall load on the neural processing resources 250.

Examples provided herein further recognize that with precise navigation point signals 212, the neural processing resources 250 may end up relying heavily on tracking the signals 212 without sufficient reliance on the sensor data 272. Thus, the neural network navigation system 200 can include noise generator 215 to introduce or otherwise incorporate noise (e.g., Gaussian distributed noise) into the navigation point signals 212 to generate coarse navigation points 217 for the neural processing resources 250 to track along the route 242. The introduced noise can result in larger horizontal error in the navigation point signals 212, and can cause the neural network processing resources 250 to desirably rely on the sensor data 272 in order to increase robustness of the system 200. Accordingly, based on the optimal route 242, the navigation point signals 212 can be run through a noise generator 215 to add noise, resulting in coarse navigation points 217. These coarse navigation points 217 can be received as inputs by the neural processing resources 250—along with the sensor data 272 and destination coordinates 214—to generate control instructions 242 to autonomously operate the control mechanisms of the SDV 200.

Accordingly, the neural processing resources 250 can extract the coarse navigation points 217 in global coordinates to localize along the optimal route 242 and continuously compute a future destination for the SDV 200. For example, the neural processing resources 250 can extract multiple coarse navigation points 217 at predetermined distances or temporally ahead of the SDV 201 along the optimal route 242 (e.g., based on the SDV's orientation and/or localization parameters), and continuously monitor the coordinate values of each of the coarse navigation points 217. In one aspect, the neural processing resources 250 compare the coordinate values of the coarse navigation points 217 to vehicle coordinates 211 of the SDV 201 to make mid or high level decisions with regard to an immediate route plan for an upcoming route segment. Additionally or alternatively, the neural processing resources 250 can correlate the coordinate values of the coarse navigation points 217, which can indicate, among other things, an upcoming turn. In one example, for Cartesian implementations, converging x-values between the navigation points 217 can indicate an upcoming or imminent turn, whereas the positive or negative aspect of the y-value can indicate the direction of the turn, as illustrated further in FIG. 3. For polar coordinate implementations, diverging angular values can indicate an upcoming turn and a turn direction. In any case, the neural processing resources 250 can utilize the coordinate values of the coarse navigation points 217 to adjust inputs for accelerating, braking, and steering the SDV 201.

The neural processing resources 250 can further receive, as additional input, the destination coordinates 214 as local coordinates in relation to the SDV 201. Additionally, each road segment for each immediate route plan can comprise one or more upcoming or immediate destinations in local coordinates of the SDV's local coordinate system (i.e., with the SDV's dynamic position as the origin). Each of these destinations can comprise fixed destination coordinates 214 in the SDV's local coordinate system. Accordingly, the neural processing resources 250 can utilize the destination coordinates 214 as successive targeted endpoints for each immediate route segment, or as an overall endpoint for the current trip. Thus, in operating the SDV's control mechanisms, the neural processing resources 250 can compare the navigation point coordinate values with the SDV's current coordinates and orientation (and additional vehicle parameters, such as speed, acceleration and braking inputs, etc.), and the successive destination coordinates 214. In executing the machine learning model 236, the neural processing resources 250 can be trained to balance processing between tracking the coarse navigation points 217 along the route 242 and analyzing the sensor data 272 for potential hazards. In doing so, the neural processing resources 250 can generate control instructions 242 executable by an SDV control unit 280 to operate the steering system 282, braking system 284, acceleration system 286, and the signaling and auxiliary systems 288 of the SDV 201. In certain implementations, the neural network navigation system 200 can include a SDV control interface 245 through which the control instructions 242 are transmitted to the SDV control unit 280 for execution. The SDV control unit 280 can process the control instructions 242 to generate control commands 289 for direct implementation on the steering 282, braking 284, acceleration 286, and/or signaling systems 288 of the SDV 201.

The logical processes shown in connection with FIG. 2 are discussed in the context of logical blocks representing various elements and logic flows of the neural network navigation system 200. However, one or more of the foregoing processes may be performed by the backend datacenter 290, such as establishing the navigation points 217 based on the current location 297 of the SDV 201 and the optimal route 242, introducing noise to the navigation point signals 212, and determining the optimal route 242 for the SDV 201 to the destination 262. Thus, in the context of FIG. 2, the coarse navigation points 217 may be established by the datacenter 290 in global coordinates fixed to the SDV's 200 frame of reference, enabling the neural processing resources 250 to utilize basic road network maps 231 to extract and track the coarse navigation points 217 in order to autonomously operate the SDV 200 along the route 242. In doing so, the neural processing resources 250 may not only follow the route and perform lane-keeping, but may also make decisions concerning upcoming turns, such as lane selection, signaling, safety checks (e.g., analyzing the sensor data 272 for safe lane-changing and turning opportunities), and anticipatory braking and acceleration.

Self-Driving Vehicle in Operation

Figure 3:
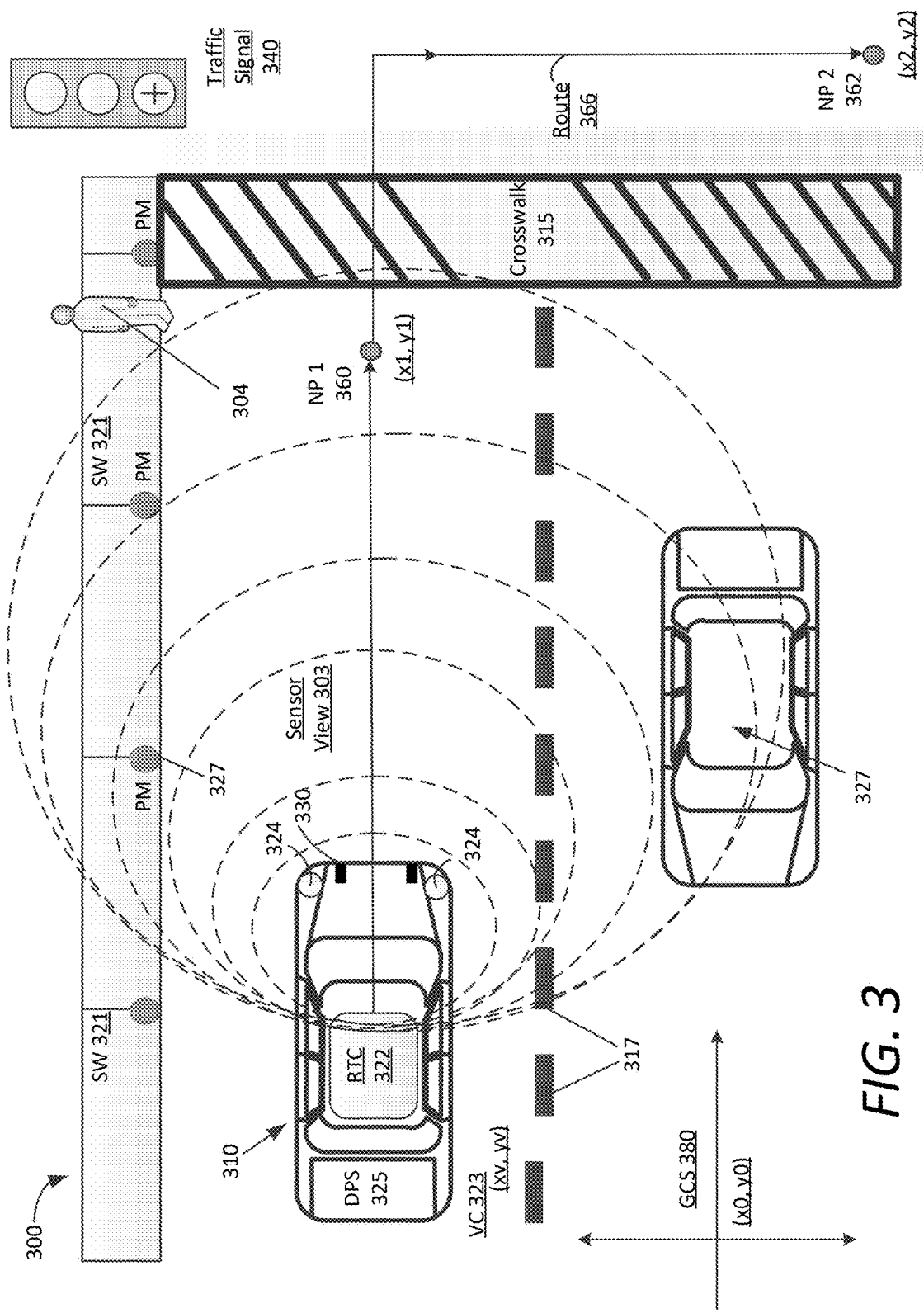
FIG. 3 shows an example of an autonomously controlled self-driving vehicle utilizing sensor data to navigate an environment in accordance with example implementations.

FIG. 3 shows an example of an autonomously controlled self-driving vehicle utilizing sensor data to navigate an environment in accordance with example implementations. In an example of FIG. 3, the autonomous vehicle 310 may include various sensors, such as a roof-top camera array (RTC) 322, forward-facing cameras 324 and laser rangefinders 330. In some aspects, a data processing system 325, comprising a combination of one or more processors, FPGAs, and/or memory units, can be positioned in the cargo space of the vehicle 310.

According to an example, the vehicle 310 uses one or more sensor views 303 (e.g., a stereoscopic or 3D image of the environment 300) to scan a road segment on which the vehicle 310 traverses. The vehicle 310 can process image data or sensor data, corresponding to the sensor views 303 from one or more sensors in order to detect objects that are, or may potentially be, in the path of the vehicle 310. In an example shown, the detected objects include a pedestrian 304 and another vehicle 327—each of which may potentially cross into a road segment 315 along which the vehicle 310 traverses. The vehicle 310 can use information about the road segment and/or image data from the sensor views 303 to determine that the road segment includes a divider 317 and an opposite lane, as well as a sidewalk (SW) 321 and sidewalk structures such as parking meters (PM) 327.

The vehicle 310 may determine the location, size, and/or distance of objects in the environment 300 based on the sensor view 303. For example, the sensor views 303 may be 3D sensor images that combine sensor data from the roof-top camera array 322, front-facing cameras 324, and/or laser rangefinders 330. Accordingly, the vehicle may accurately detect the presence of objects in the environment 300, allowing the vehicle to safely navigate the route while avoiding collisions with other objects.

According to examples, the vehicle 310 may determine a probability that one or more objects in the environment 300 will interfere or collide with the vehicle 310 along the vehicle's current path or route. In some aspects, the vehicle 310 may selectively perform an avoidance action based on the probability of collision. The avoidance actions may include velocity adjustments, lane aversion, roadway aversion (e.g., change lanes or drive further from the curb), light or horn actions, and other actions. In some aspects, the avoidance action may run counter to certain driving conventions and/or rules (e.g., allowing the vehicle 310 to drive across center line to create space with bicyclist).

In variations, the vehicle 310 may implement a deep neural network through a series of training, test, and real-world implementation phases to ultimately build a robust skillset in autonomously operating the vehicle 310 on par with or exceeding human ratings or safety standards for autonomous driving. Thus, in analyzing the sensor view 303, the deep neural network can make on-the-fly assessments with regard to each detected object, and proactively control the autonomous vehicle 310 in accordance with certain safety standards (e.g., Safe Practices for Motor Vehicle Operations standards). In doing so, the deep neural network can seek to optimize autonomous driving habits in light of minimizing risk of collision (e.g., by identifying and anticipating potentially dangerous situations), implementing an assured clear distance ahead (e.g., a velocity-based following standard), and even practicing specific driving techniques geared towards efficiency and safety.

In an example, the data processing system 325 can implement the deep neural network (e.g., via execution of a set of machine learning algorithms) to identify static objects such as parking meters 327, and can accurately determine that the parking meters 327 are fixed objects (e.g., based on their relatively static or stable locations in the sensor views 303). The deep neural network can further detect and positively identify potential hazards, such as the pedestrian 304 and other vehicle 327. The deep neural network can further identify other objects in the sensor view 303 that may affect the manner in which the autonomous vehicle 310 travels along its given route 366, such as a crosswalk 315 and traffic signal 340. In performing lane-keeping, the deep neural network can identify the lane divider markers 317 and other road features indicating the bounds of the current lane being traveled (e.g., painted lines, curbs, parked cars, bike lanes, transition zones from concrete or asphalt to dirt or grass, and the like).

According to examples described herein, the deep neural network can extract one or more navigation points (e.g., navigation point 360 and navigation point 362) along the current route 366 of the vehicle 310. In some aspects, the navigation points 360, 362 can comprise two-dimensional Cartesian coordinate points established in global coordinates, and can be affixed as "carrot" points to the non-inertial reference frame of the vehicle 310. In the context of FIG. 3, the coordinate values of each navigation point 360, 362 can vary with respect to the global coordinate system 380 as the vehicle 310 travels along the current route 366. Thus, the deep neural network can track the navigation points 360, 362 along the route 366, dynamically compare the coordinate values of the navigation points 360, 362 with respect to each other (and/or the vehicle coordinates 323 of the SDV 310), and utilize the compared values to make decisions regarding the upcoming road segment of the SDV 310, such as lane selections and anticipatory actions (e.g., braking, signaling, checking individual portions of the sensor view, etc.).

In the example shown in FIG. 3, the global coordinate system 380 can comprise a mapping grid for a given area (e.g., based on an east/west and north/south grid, corresponding to the x and y axes respectively) that enables the deep neural network to determine upcoming characteristics of the route 366—such as road curves and turns—by following the navigation points 360, 362. In one aspect, the deep neural network can utilize the vehicle's own coordinates 323 to compare with one or more navigation points 360, 362 set in the forward direction of the vehicle. As such, converging x-values can correspond to an upcoming turn, and diverging y-values can correspond to the direction of the upcoming turn. The x-convergence and y-divergence (assuming current travel in an x direction) can enable the deep neural network to respond to by selecting an appropriate lane, signaling using the vehicle's directional signals, braking at the upcoming intersection or turn, and steering and accelerating to complete the turn.

The use of two-dimensional Cartesian coordinates is provided herein for illustration only, and is not meant to be limiting in any way. The navigation points 360, 362, the vehicle coordinates 323, and the destination coordinates may be in any two-dimensional or three-dimensional coordinate system or reference frame, and can utilize any combination of Cartesian global and local coordinates, two-dimensional polar global coordinates and local coordinates, and/or three-dimensional spherical global and/or local coordinates. Thus, the deep neural network implemented on the data processing system 325 can extract the coordinate values of the navigation points 360, 362 (in any set coordinate system)—as the vehicle 310 travels throughout a given region—for dynamic comparison in order to determine an immediate route plan (e.g., for the next hundred meters or the next thirty seconds of driving) and execute any number control actions on the vehicle 310 to implement the immediate route plan.

In conjunction with the route following discussion utilizing the navigation points 360, 362, the deep neural network can dynamically analyze the sensor view 303 for lower level safety concerns, such as potential hazard threats from other vehicles 327 and local pedestrians 304. The deep neural network may further process the sensor view 303 to identify road and traffic features—such as the traffic signal 340 and signal state (e.g., red, yellow, or green), crosswalk 315, sidewalk 321, and lane divider 317—in order to make lower level decisions with regards to actual execution of lane changes, braking for an upcoming intersection, and safely executing upcoming turns identified by the navigation points 360, 362.

Methodology

Figure 4:
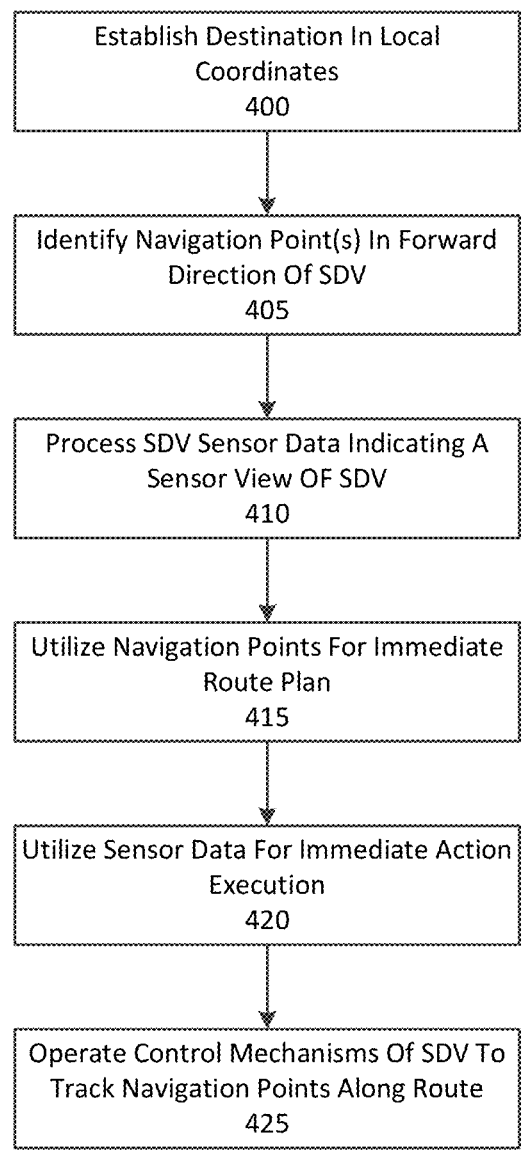
FIG. 4 is a flow chart describing an example method of autonomously operating a self-driving vehicle through use of a neural network, according to examples described herein.

FIG. 4 is a flow chart describing an example method of autonomously operating a self-driving vehicle through use of a neural network, according to examples described herein. In the below description of FIG. 4, reference may be made to reference characters representing like features as shown and described with respect to FIGS. 1-3. Furthermore, the method described in connection with FIG. 4 may be performed by a neural network 124 or neural network navigation system 200 being implemented on a self-driving vehicle 100, 200, as shown and described herein. Referring to FIG. 4, the neural network 124 can establish a destination 119 in local coordinates (400). The neural network 124 can further identify one or more navigation points 129 in a forward operational direction of the SDV 100 (405). As provided herein, the navigation points 129 may be extracted and established at affixed distances (or temporally) ahead of the SDV 100 by a backend entity with knowledge of the destination 119 and optimal route 123. In variations, the navigation points 129 may be extracted and established by a separate module of the of the SDV 100, or the neural network 124 itself, once the optimal route 123 to the destination 119 is determined.

In operating the control mechanisms 155 of the SDV 100, The neural network 124 may also process sensor data 111 indicating a sensor view from a sensor array 102 of the SDV 100 (410). According to some aspects described herein, the neural network 124 can utilize the navigation points 129 dynamically for an immediate route plan (415). Accordingly, the neural network 124 can compare the individual coordinate values of the navigation points 129 with each other— and/or with the vehicle coordinates of the SDV 100—in order to determine the immediate route plan for the upcoming road segment. The immediate route plan can comprise a plan for the next fifty or one hundred meters—or a set time period (e.g., the next thirty seconds)—of the overall route 123 of the SDV 100, and can correlate directly with the location of the navigation points 129 ahead of the SDV 100. Thus, the immediate route plan can correspond to an upcoming turn in which the SDV 100 must signal, change lanes, and execute the turn.

In various implementations, the neural network 124 may utilize the sensor data 111 for immediate action execution (420). The immediate action execution can comprise generating the individual command inputs 135 executable by the individual control mechanisms 155 of the SDV 100, such as the SDV's acceleration 152, steering 154, braking 156, and auxiliary systems 158. While executing the immediate route plan determined via comparison of the navigation points 129 (and/or the vehicle's own coordinates), the neural network 124 can analyze the sensor data 111 to determine exactly when to change lanes, brake for an intersection or potential hazard, and accelerate and steer the SDV 100 when the situation is safe to complete the turn. Thus, the neural network 124 can autonomously operate the control mechanisms 155 of the SDV 100 to track the navigation points 129 along the given route 123 (425).

Figure 5:
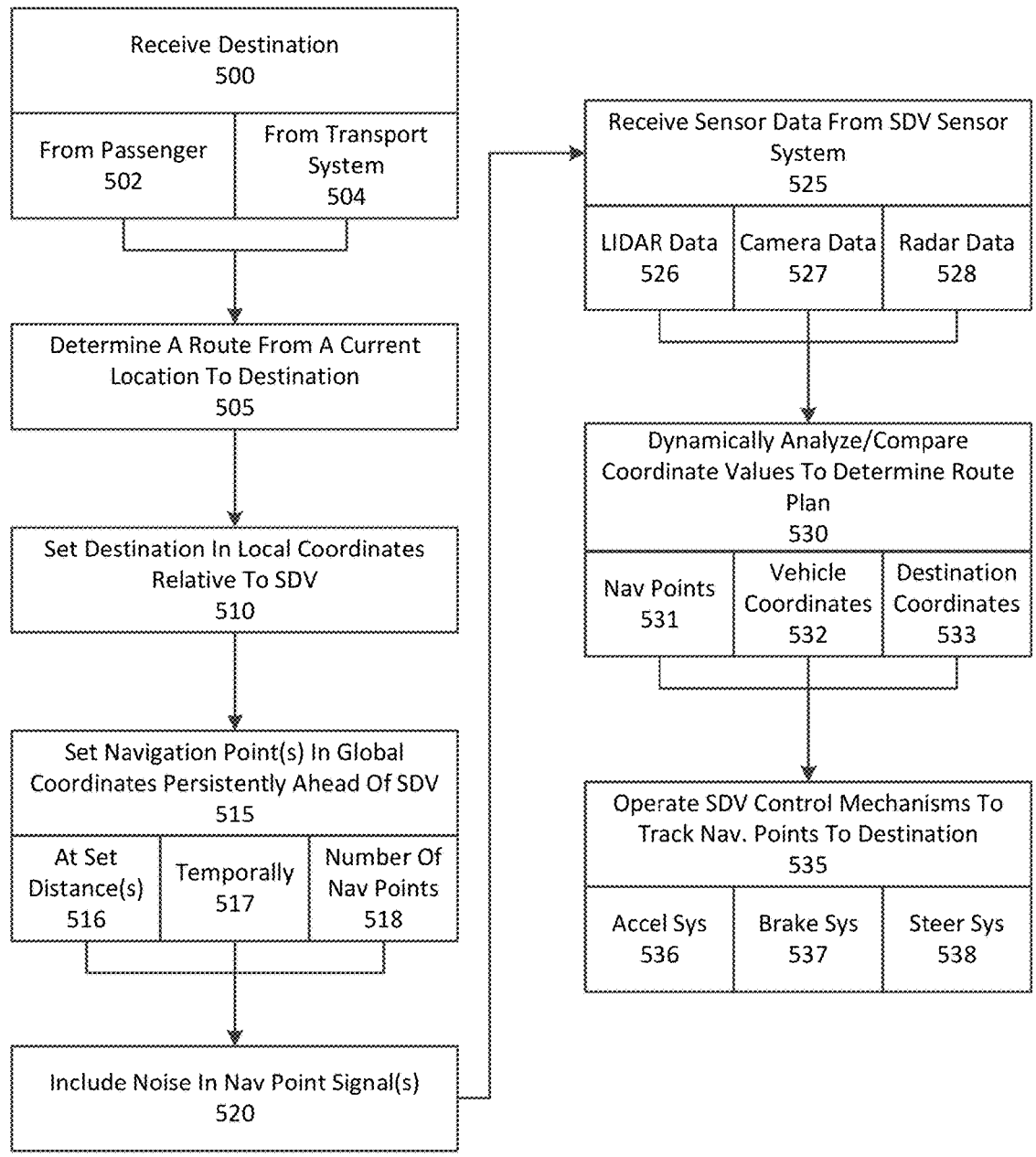
FIG. 5 is a lower level flow chart describing an example method of autonomously operating a self-driving vehicle through use of a neural network, according to examples described herein.

FIG. 5 is a lower level flow chart describing an example method of autonomously operating a self-driving vehicle through use of a neural network, according to examples described herein. In the below description of FIG. 5, reference may be made to reference characters representing like features as shown and described with respect to FIGS. 1-3. Furthermore, the method described in connection with FIG. 5 may be performed by a neural network 124 or neural network navigation system 200 being implemented on a self-driving vehicle 100, 200, as shown and described herein. Referring to FIG. 5, the neural network navigation system 200 can receive a destination 262 (500). The destination 262 can be received from a backend transportation management system implemented on a datacenter 290 (504), or can be inputted directly by a passenger of the SDV 201 through use of a local user interface (502).

In various implementations, the neural network navigation system 200 can determine a route 242 from a current location to the destination 262 (505), and set the destination 262 in local coordinates relative to the SDV 201 (510). The neural network navigation system 200 can further set one or more navigation points 212 in global coordinates, and affix or otherwise configure the navigation point(s) 212 to the non-inertial reference frame of the SDV 201 (515). In doing so, the neural network navigation system 200 can set the navigation points at persistent distances ahead of the SDV 201 along the route 242 (516), or temporally such that the navigation points 212 vary in distance from the SDV 201 (e.g., based on the SDV's current speed (517). For example, the temporal location for each of the navigation points 212 may be based on a computation of a time step (e.g., one or two seconds ahead of the SDV 201) and the SDV's current speed. In variations, the global coordinate values of the SDV 201 (e.g., via the GPS module 210) can be utilized to establish a local coordinate system with the SDV's current, dynamic location as the origin. In such variations, the navigation points 212, and successive upcoming destination coordinates 214, can be established in the SDV's local coordinate system along the route 242. As an example, a local Cartesian coordinate system (e.g., a two-dimensional x-y system) can be established with the positive x-axis extending in the forward operational direction of the SDV 201, and positive y-axis extending to the left of the SDV 201. The navigation point coordinates 212 and/or the successive destination coordinates 214 can be established with respect to this local Cartesian system, enabling the neural network processing resources 250 to readily identify, for example, an upcoming turn. In some aspects, the neural network navigation system 200 can set a combination of distance-based and temporally-based navigation points 212 to further increase robustness. Furthermore, the neural network navigation system 200 can set the number of navigation points (518), and can include a single point, or multiple points at various distances and/or times ahead of the SDV 201 along the route.

Additionally, the neural network navigation system 200 can include or otherwise introduce noise into the navigation point signals 212, such that the navigation points 212 comprise coarse navigation points 217 with a certain amount of increased horizontal error (520). As described herein, this can prevent the neural processing resources 250 of the neural network navigation system 200 to over-rely on the navigation points 217 in at least the training phase of the system 200, resulting in increased robustness of the system 200. In some aspects, the noise can be included in only the training and/or testing phases of the system 200. In such aspects, the noise can be excluded or reduced in the implementation phase. In variations, the noise may also be included during implementation of the system 200 on public roads. The neural network navigation system 250 can further receive sensor data 272 from the SDV sensor systems (525), which can include LIDAR data (526), camera or image data (527), and/or radar data (528). It is contemplated that the neural network navigation system 250 can be agnostic to the type of sensor data sources, and can utilize data from any individual sensor system (e.g., a single monocular, forward-facing camera), or combinations of sensor systems described herein.

In various implementations, the neural network navigation system 200 can dynamically analyze and compare coordinate values to continuously or periodically (e.g., every few seconds) determine an immediate route plan (530). As discussed above, the neural network navigation system 200 can compare various combinations of individual coordinate values of the coarse navigation points 217 (531), the vehicle coordinates of the SDV 201 (532), and the destination coordinates 214 (533). In certain implementations, the neural processing resources can determine a heading of the SDV 201, and utilize the heading to make comparisons between the coordinate values to ultimately determine the immediate route plan. Based on each of the immediate route plans, the neural network navigation system 200 can operate the SDV control mechanisms in order to track the coarse navigation points 217 to the destination 262 (535). Accordingly, the neural network navigation system 200 can operate the acceleration system 286 (536), the braking system 284 (537), and the steering system 282 (538) of the SDV 201 in order to perform the low level autonomous actions that progress the SDV 201 along each immediate route plan along the overall route 242 to the destination 262.

Hardware Diagrams

Figure 6:
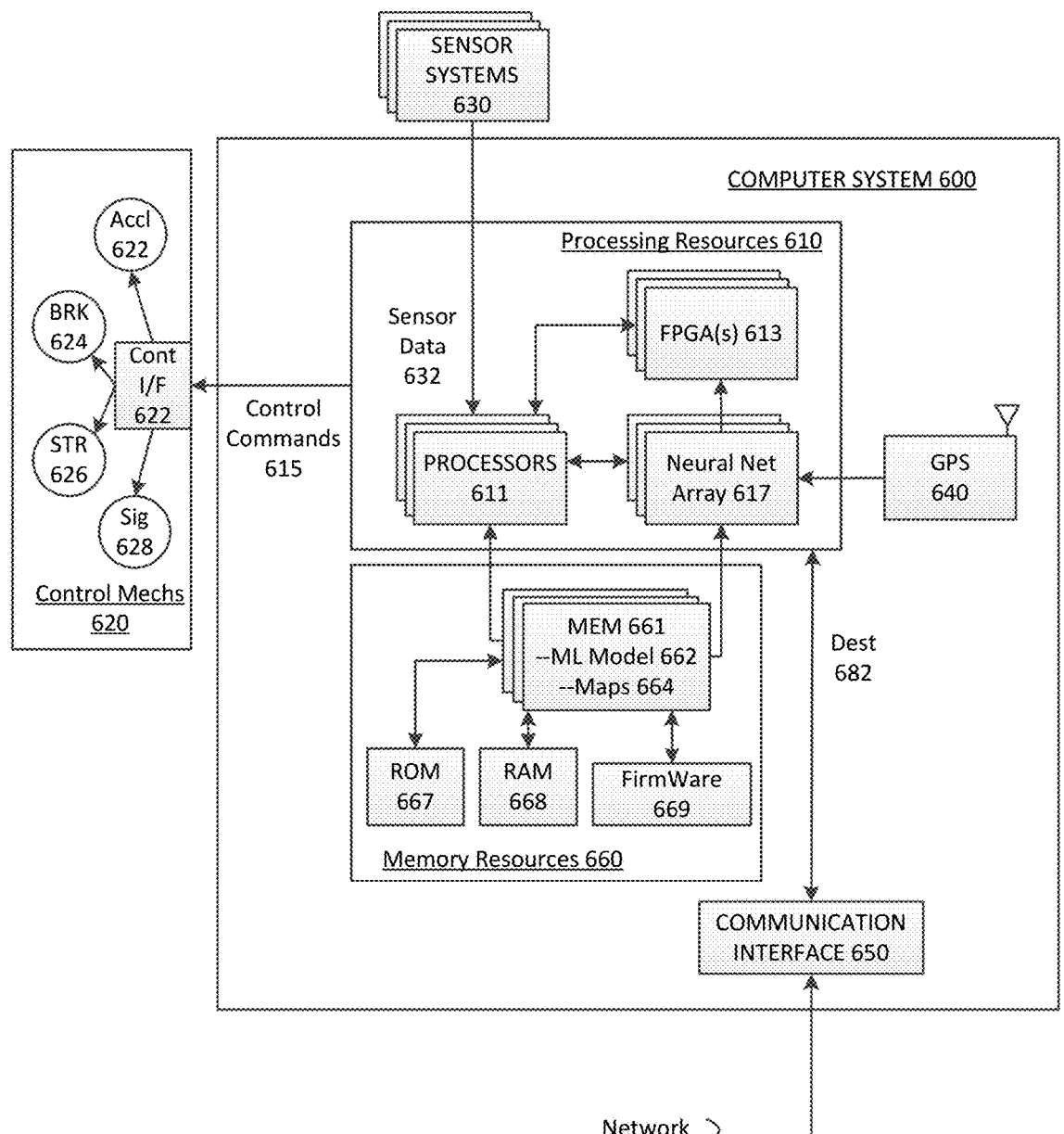
FIG. 6 is a block diagram illustrating a computer system for a self-driving vehicle upon which examples described herein may be implemented.

FIG. 6 is a block diagram illustrating a computer system upon which example SDV processing systems described herein may be implemented. The computer system 600 can be implemented using a number of processing resources 610, which can comprise processors 611, field programmable gate arrays (FPGAs) 613. Furthermore, any number of processors 611 and/or FPGAs 613 of the computer system 600 can be utilized as components of a neural network array 617 implementing a machine learning model 662 and utilizing road network maps 664 stored in memory 661 of the computer system 600. In the context of FIGS. 1 and 2, the control system 120, neural network 124, and neural network navigation system 200 can be implemented using one or more components of the computer system 600 shown in FIG. 6.

According to some examples, the computer system 600 may be implemented within an autonomous vehicle or self-driving vehicle (SDV) with software and hardware resources such as described with examples of FIGS. 1 and 2. In an example shown, the computer system 600 can be distributed spatially into various regions of the SDV, with various aspects integrated with other components of the SDV itself. For example, the processing resources 610 and/or memory resources 660 can be provided in a cargo space of the SDV. The various processing resources 610 of the computer system 600 can also execute control instructions and the machine learning model 662 (e.g., comprising a set of machine learning algorithms) using microprocessors 611, FPGAs 613, or any combination of the same. In some examples, the machine learning model 662 can be executed by various combinations of processors 611 and/or FPGAs 613 that make up the neural network array 617. Along these lines, various executable tasks embedded in the machine learning model 662 may be distributed amongst the multiple types of processing resources 610 of the computer system 600 that make up the neural network array 617.

In an example of FIG. 6, the computer system 600 can include a communication interface 650 that can enable communications over a network 680. In one implementation, the communication interface 650 can also provide a data bus or other local links to electro-mechanical interfaces of the vehicle, such as wireless or wired links to and from control mechanisms 620 (e.g., via a control interface 622), sensor systems 630, and can further provide a network link to a backend transport management system (implemented on one or more datacenters) over one or more networks 680. For example, the processing resources 610 can receive a destination 682 over the one or more networks 680, or via a local user interface of the SDV.

The memory resources 660 can include, for example, main memory 661, a read-only memory (ROM) 667, storage device, and cache resources. The main memory 661 of memory resources 660 can include random access memory (RAM) 668 or other dynamic storage device, for storing information and instructions which are executable by the processing resources 610 of the computer system 600. The processing resources 610 can execute instructions for processing information stored with the main memory 661 of the memory resources 660. The main memory 661 can also store temporary variables or other intermediate information which can be used during execution of instructions by the processing resources 610. The memory resources 660 can also include ROM 667 or other static storage device for storing static information and instructions for the processing resources 610. The memory resources 660 can also include other forms of memory devices and components, such as a magnetic disk or optical disk, for purpose of storing information and instructions for use by the processing resources 610. The computer system 600 can further be implemented using any combination of volatile and/or non-volatile memory, such as flash memory, PROM, EPROM, EEPROM (e.g., storing firmware 669), DRAM, cache resources, hard disk drives, and/or solid state drives.

According to some examples, the memory 661 may store a set of software instructions and/or machine learning algorithms including, for example, the machine learning model 662. The memory 661 may also store road network maps 664 in which the processing resources 610—executing the machine learning model 662—can utilize to extract and follow navigation points (e.g., via location-based signals from a GPS module 640), introduce noise to the navigation point signals, determine successive route plans, and execute control actions on the SDV. The machine learning model 662 may be executed by the neural network array 617 in order to autonomously operate the SDV's acceleration 622, braking 624, steering 626, and signaling systems 628 (collectively, the control mechanisms 620). Thus, in executing the machine learning model 662, the neural network array 617 can make mid or high level decisions with regard to upcoming route segments, and the processing resources 610 can receive sensor data 632 from the sensor systems 630 to enable the neural network array 617 to dynamically generate low level control commands 615 for operative control over the acceleration, steering, and braking of the SDV. The neural network array 317 may then transmit the control commands 615 to one or more control interfaces 622 of the control mechanisms 620 to autonomously operate the SDV through road traffic on roads and highways, as described throughout the present disclosure.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A neural network system for autonomous control of a self-driving vehicle (SDV), the neural network system comprising:
    one or more processors; and
    one or more memory resources storing a machine learning model that, when executed by the one or more processors, cause the neural network system to:
        establish a destination location in local coordinates relative to the SDV;
        identify one or more navigation points in a forward operational direction of the SDV;
        process sensor data from a sensor system of the SDV, the sensor data providing a sensor view of the forward operational direction of the SDV;
        determine, using a location-based resource, a current position of the SDV, wherein the one or more navigation points are computed based on the current position of the SDV and the established route to the destination location; and
        utilizing the sensor data, operate acceleration, braking, and steering systems of the SDV to continuously follow the one or more navigation points along an established route to the destination location; wherein noise is incorporated into location signals corresponding to the one or more navigation points, and wherein the noise causes the neural network system to rely on processing the sensor data in conjunction with continuously following the one or more navigation points.

2. The neural network system of claim 1, wherein the executed machine learning model causes the neural network system to identify each of the one or more navigation points at (i) a constant distance ahead of the SDV along the established route, or (ii) a temporal location ahead of the SDV, based on a current speed of the SDV, along the established route.

3. The neural network system of claim 1, wherein the one or more navigation points each comprises a coordinate point in global coordinates, the coordinate point having values that vary as the SDV progresses towards the destination location, and wherein the executed machine learning model causes the neural network system to continuously follow the one or more navigation points along the established route to the destination location by continuously comparing the values of the coordinate point with vehicle coordinates of the SDV.

4. The neural network system of claim 1, wherein the one or more navigation points comprise a plurality of navigation points established at differing distances ahead of the SDV along the established route.

5. The neural network system of claim 4, wherein the executed machine learning model causes the neural network system to (i) utilize the plurality of navigation points to dynamically determine an immediate route plan, and (ii) analyze the sensor data to execute control actions on the acceleration, braking, and steering systems of the SDV in order to dynamically implement the immediate route plan.

6. A self-driving vehicle (SDV) comprising:
a sensor system to detect a situational environment of the SDV;
acceleration, braking, and steering systems; and
a control system comprising a neural network implementing a machine learning model that causes the control system to:
establish a destination location in local coordinates relative to the SDV;
identify one or more navigation points in a forward operational direction of the SDV;
process sensor data from the sensor system of the SDV, the sensor data providing a sensor view of the forward operational direction of the SDV;
determine, using a location-based resource, a current position of the SDV, wherein the one or more navigation points are computed based on the current position of the SDV and the established route to the destination location; and
utilize the sensor data, operate acceleration, braking, and steering systems of the SDV to continuously follow the one or more navigation points along an established route to the destination location; wherein noise is incorporated into location signals corresponding to the one or more navigation points, and wherein the noise causes the neural network system to rely on processing the sensor data in conjunction with continuously following the one or more navigation points.

7. The SDV of claim 6, wherein the machine learning model implemented by the neural network causes the control system to identify each of the one or more navigation points at (i) a constant distance ahead of the SDV along the established route, or (ii) a temporal location ahead of the SDV, based on a current speed of the SDV, along the established route.

8. The SDV of claim 6, wherein the one or more navigation points each comprises a coordinate point in global coordinates, the coordinate point having values that vary as the SDV progresses towards the destination location, and wherein the machine learning model implemented by the neural network causes the control system to continuously follow the one or more navigation points along the established route to the destination location by continuously comparing the values of the coordinate point with vehicle coordinates of the SDV.

9. The SDV of claim 6, wherein the one or more navigation points comprise a plurality of navigation points established at differing distances ahead of the SDV along the established route.

10. The SDV of claim 9, wherein the machine learning model implemented by the neural network causes the control system to (i) utilize the plurality of navigation points to dynamically determine an immediate route plan, and (ii) analyze the sensor data to execute control actions on the acceleration, braking, and steering systems of the SDV in order to dynamically implement the immediate route plan.

11. A computer implemented method of autonomously operating a vehicle, the method being performed by one or more processors of a neural network system of a self-driving vehicle (SDV) and comprising:
establishing a destination location in local coordinates relative to the SDV;
identifying one or more navigation points in a forward operational direction of the SDV;
processing sensor data from a sensor system of the SDV, the sensor data providing a sensor view of the forward operational direction of the SDV;
determining, using a location-based resource, a current position of the SDV, wherein the one or more navigation points are computed based on the current position of the SDV and the established route to the destination location; and
utilizing the sensor data, operating acceleration, braking, and steering systems of the SDV to continuously follow the one or more navigation points along an established route to the destination location; wherein noise is incorporated into location signals corresponding to the one or more navigation points, and wherein the noise causes the neural network system to rely on processing the sensor data in conjunction with continuously following the one or more navigation points.

12. The method of claim 11, wherein the neural network system identifies each of the one or more navigation points at (i) a constant distance ahead of the SDV along the established route, or (ii) a temporal location ahead of the SDV, based on a current speed of the SDV, along the established route.

13. The method of claim 11, wherein the one or more navigation points each comprises a coordinate point in global coordinates, the coordinate point having values that vary as the SDV progresses towards the destination location, and wherein the neural network system continuously follows the one or more navigation points along the established route to the destination location by continuously comparing the values of the coordinate point with vehicle coordinates of the SDV.

14. The method of claim 11, wherein the one or more navigation points comprise a plurality of navigation points established at differing distances ahead of the SDV along the established route.

* * * * *